UNITED STATES PATENT OFFICE.

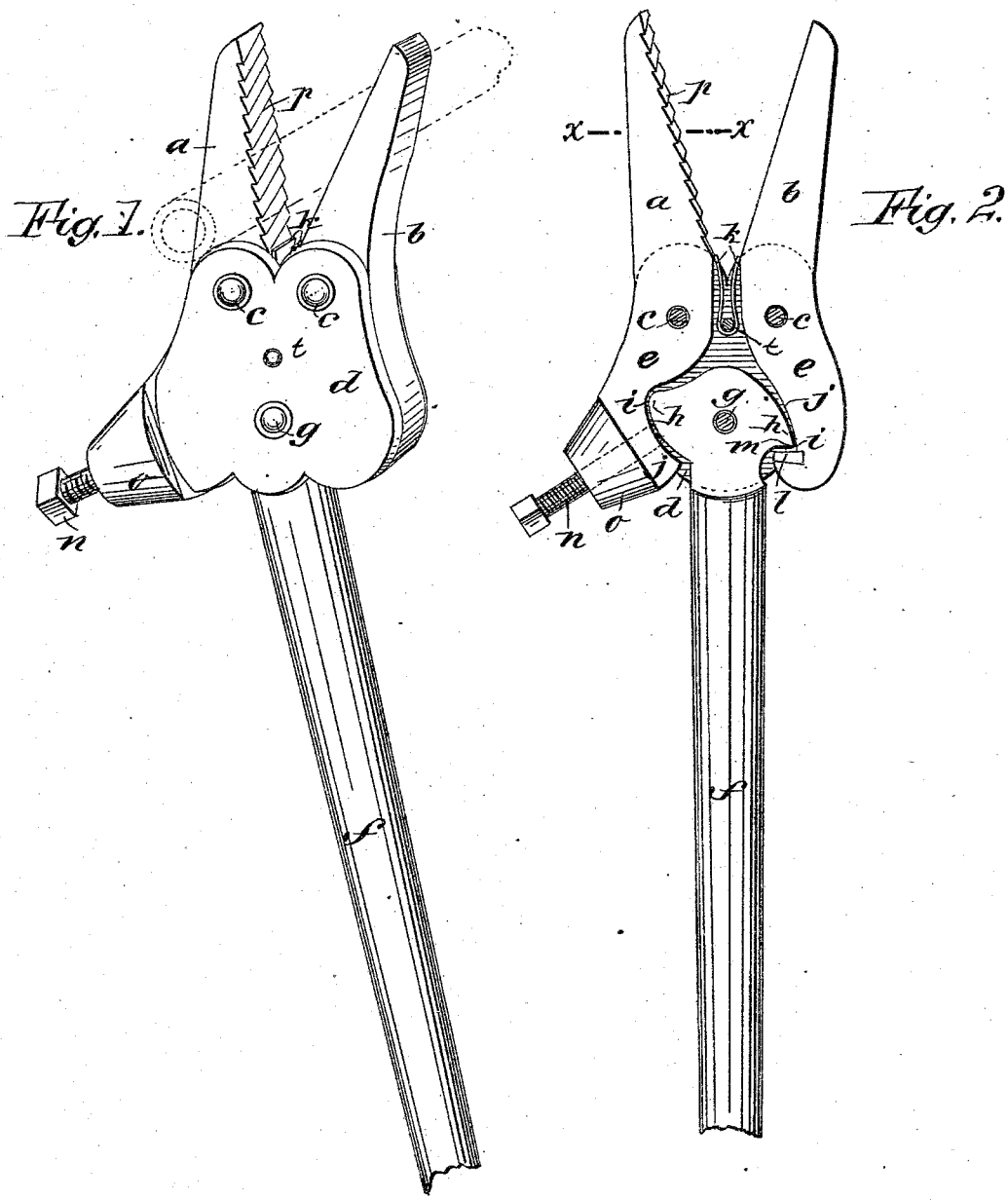

DWIGHT MORSE DE SILVA, OF CORNING, NEW YORK.

WRENCH.

SPECIFICATION forming part of Letters Patent No. 296,540, dated April 8, 1884.

Application filed December 4, 1883. (Model.)

*To all whom it may concern:*

Be it known that I, DWIGHT M. DE SILVA, of Corning, in the county of Steuben and State of New York, have invented a new and Improved Wrench, of which the following is a full, clear, and exact description.

My invention consists of jaws pivoted to a head-block, whereon a handle is also pivoted between arms of the jaws, extending back of the pivots, on which cams of the head of the handle act so as to cause the jaws to "bite" the nut, pipe, or other object to be turned with great power when the handle is moved for turning said nut or other object.

My invention also consists in details of construction of various parts of the wrench, all as hereinafter fully described.

Reference is to be had to the accompanying drawings, forming part of this specification, in which similar letters of reference indicate corresponding parts in all the figures.

Figure 1 is a perspective view of my improved wrench. Fig. 2 is a side elevation with one of the plates forming the head-block to which the jaws and handle are pivoted removed, and Fig. 3 is a cross-section of one of the jaws.

I make a pair of taper jaws, $a$ $b$, and pivot them at $c$ between two plates, $d$, forming a head-block, said jaws each having a curved arm, $e$, extending back from the pivots $c$ in the direction of the handle $f$, which is also pivoted between said plates at $g$. The handle $f$ has cams $h$, which bear on the inner sides of the curved arms $e$ at $i$ when the jaws $a$ $b$ are open, and they move along the curves $j$ when the handle $f$ is passed to the right hand, after the jaws have been placed on the nut or other object to be turned, and wedge the arms apart and force the jaws together with great power for gripping the object between them, the force of the grip of the jaws being in proportion to the force applied to the handle, so that any object offering great resistance will be gripped accordingly, and thus the grip of the jaws will always be adequate to the resistance of the object gripped. A spring, $k$, is arranged between the jaws to open them promptly when the handle is shifted back, and to hold them open, and one of the jaws has a hook, $l$, and the handle has a shoulder, $m$, which form stops to limit the backward swing of the handle to a line with the jaws, and so that the cams cannot be brought to act when the handle is swung back to the starting-point. To set the jaws for smaller articles, and particularly to enable them to grip an object at the ends, as a piece of pipe lying on the floor, I provide one of the arms $e$ with an adjusting-screw, $n$, fitted in a boss, $o$, so as to be set in against the cam and lessen the extent of opening of the jaws, when the cam will act on the point of the screw instead of on the curve $j$ of the arm, bringing the points of the jaws together with a slight movement of the handle. I may employ an adjusting-screw, $n$, in each jaw-arm, if preferred. One of the jaws, or both, as preferred, will have a toothed or serrated face for greater holding-power, and I propose to make one of the jaws with a beveled face, $p$, Fig. 3, to form an angle for further increasing the holding-power of the grip, the said bevel-face to be on the jaw that draws or pulls on the object gripped, whereby the corner of the serrations at the highest side of the face will bite quickly and cause the jaws to grip more securely and without slip.

In this example the spring $k$ is represented as secured by a pin fitted through the plates; but in practice it may be preferred to cast the plates with a stud on each, which studs will meet together, or nearly so, when the plates are fitted to the jaws.

I propose to curve the jaws $a$ $b$ in some cases, as may be required, to adapt them to different objects of different shapes.

Having thus described my invention, what I claim as new, and desire to secure by Letters Patent, is—

1. In a wrench, the combination, with the plates $d$ and the pivoted and spring-pressed jaws $a$ $b$, having curved arms $e$ $j$, of the handle $f$, pivoted between the said jaws, and provided with cams $h$, substantially as herein shown and described.

2. In a wrench, the combination, with the plates $d$ and the pivoted and spring-pressed jaws $a$ $b$, each having curved arms $e$ $j$, and the jaw $b$, having the hook $l$, of the handle $f$, pivoted between the said jaws, and provided with the cams $h$ and shoulder $m$, substantially as herein shown and described.

3. In a wrench, a serrated jaw made with a beveled face, substantially as specified.

4. In a wrench, the combination, with the plates $d$ and the handle $f$, having cams $h$, and the pivoted jaws $a\ b$, having curved arms $e\ j$, of the adjusting-screw $n$, passing through the curved arm of one jaw and resting against one of the cams of the handle, substantially as herein shown and described.

5. In a wrench having gripping-jaws $a\ b$, the jaw $a$, having a beveled and serrated gripping-face, $p$, to form an angle-edge to grip the object to be turned, substantially as described.

DWIGHT MORSE DE SILVA.

Witnesses:
GEORGE M. CLARK,
JOHN J. SCHAFER.